(12) United States Patent
Kato et al.

(10) Patent No.: US 7,491,022 B2
(45) Date of Patent: Feb. 17, 2009

(54) INCLINING AND ROTATING TABLE APPARATUS

(75) Inventors: Heizaburo Kato, Shizuoka-ken (JP); Koki Torimaru, Aichi-ken (JP); Toshihiko Yokoe, Aichi-ken (JP)

(73) Assignees: Sanko Seisakusho Co., Tokyo (JP); Yamazaki Mazak Corporation, Aichi (JP)

( * ) Notice: Subject to any disclaimer, the term of this patent is extended or adjusted under 35 U.S.C. 154(b) by 430 days.

(21) Appl. No.: 10/966,026

(22) Filed: Oct. 18, 2004

(65) Prior Publication Data

US 2005/0139036 A1    Jun. 30, 2005

(30) Foreign Application Priority Data

Oct. 17, 2003    (JP) .............................. 2003-357307
Oct. 6, 2004     (JP) .............................. 2004-293295

(51) Int. Cl.
*B23Q 3/04*    (2006.01)

(52) U.S. Cl. .................... 409/221; 409/224; 408/89; 269/71; 74/813 L

(58) Field of Classification Search ............. 409/221, 409/224, 222, 198; 279/5; 74/813 R, 813 L, 74/816; 269/57, 61, 71; 408/89, 90
See application file for complete search history.

(56) References Cited

U.S. PATENT DOCUMENTS

| | | | | |
|---|---|---|---|---|
| 2,445,016 A * | 7/1948 | Bentley ....................... 269/59 |
| 3,228,266 A * | 1/1966 | Budney et al. ................ 82/117 |
| 3,273,879 A * | 9/1966 | Floren ......................... 269/61 |
| 3,657,963 A * | 4/1972 | Miller ......................... 409/168 |
| 3,663,027 A * | 5/1972 | Klipping .................... 279/4.03 |
| 3,700,228 A * | 10/1972 | Peale ......................... 269/61 |
| 3,998,127 A * | 12/1976 | Romeu ...................... 409/225 |
| 4,264,229 A * | 4/1981 | Falk et al. ...................... 403/5 |
| 4,568,070 A * | 2/1986 | Severt ......................... 269/60 |
| 4,653,739 A * | 3/1987 | Moore ......................... 269/61 |
| 4,678,381 A * | 7/1987 | Bailey ........................ 409/221 |
| 4,843,904 A * | 7/1989 | Moore ......................... 74/396 |
| 5,174,586 A * | 12/1992 | Saeda et al. .................... 279/5 |
| 5,234,081 A | 8/1993 | Watanabe |

(Continued)

FOREIGN PATENT DOCUMENTS

CN    1075126 A    8/1993

(Continued)

OTHER PUBLICATIONS

European Office Action mailed Dec. 7, 2005, directed to counterpart EP application No. 04256328.8.

(Continued)

*Primary Examiner*—Daniel W Howell
(74) *Attorney, Agent, or Firm*—Morrison & Foerster LLP

(57) ABSTRACT

An inclining and rotating table apparatus is provided with a rotary table device having a driven rotating shaft driven to rotate by a first drive source, and a rotary table driven to rotate by the driven rotating shaft; a driven turning shaft for causing inclination of a table surface of the rotary table device by causing the rotary table device to turn, the driven turning shaft being driven to turn by a second drive source; and a clamping device for clamping at least one of the driven rotating shaft and the driven turning shaft.

13 Claims, 14 Drawing Sheets

U.S. PATENT DOCUMENTS

| | | | | |
|---|---|---|---|---|
| 5,427,478 A * | 6/1995 | Boucher et al. | | 408/90 |
| 5,507,587 A | 4/1996 | Matsumoto | | |
| 5,823,055 A * | 10/1998 | Siler | | 74/425 |
| 5,918,510 A | 7/1999 | Uemura et al. | | |
| 6,332,604 B1 * | 12/2001 | Chu | | 269/71 |
| 6,733,217 B2 * | 5/2004 | Schworer et al. | | 409/168 |
| 6,862,786 B2 * | 3/2005 | Kato | | 29/43 |
| 6,865,788 B2 * | 3/2005 | Pasquetto | | 29/38 B |
| 6,886,225 B2 * | 5/2005 | Pasquetto | | 29/27 C |
| 7,192,018 B2 * | 3/2007 | Omori et al. | | 269/71 |
| 2002/0006764 A1 | 1/2002 | Diehl et al. | | |
| 2002/0138959 A1 | 10/2002 | Kato | | |
| 2005/0097985 A1 * | 5/2005 | Kato | | 74/813 L |
| 2005/0166728 A1 * | 8/2005 | Kato | | 82/142 |
| 2005/0254914 A1 * | 11/2005 | Kato | | 409/221 |

FOREIGN PATENT DOCUMENTS

| | | |
|---|---|---|
| EP | 1201353 A2 | 5/2002 |
| EP | 1201353 A3 | 5/2002 |
| EP | 1413390 A1 | 4/2004 |
| EP | 1524066 A1 * | 4/2005 |
| EP | 1524067 A1 * | 4/2005 |
| JP | 2002-126958 | 5/2002 |

OTHER PUBLICATIONS

Chinese Office Action, dated Jan. 4, 2008, directed to counterpart Chinese Patent Application No. 200410084182.1. 13 pages.

* cited by examiner

INCLINING AND ROTATING TABLE APPARATUS

CROSS-REFERENCE TO RELATED APPLICATIONS

The present application claims priority upon Japanese Patent Application No. 2003-357307 filed Oct. 17, 2003 and Japanese Patent Application No. 2004-293295 filed Oct. 6, 2004, which are herein incorporated by reference.

BACKGROUND OF THE INVENTION

1. Field of the Invention

The present invention relates to inclining and rotating table apparatuses.

2. Description of the Related Art

Inclining and rotating table apparatuses used in machine tools and the like are already well known. This inclining and rotating table apparatus has a driven turning shaft that is driven to turn by a drive source such as a motor or the like, and a rotary table device that is driven to turn by the driven turning shaft. The rotary table device has a driven rotating shaft that is driven to rotate by a drive source such as a motor or the like, and a rotary table that is for holding a workpiece or the like and that is driven to rotate by the driven rotating shaft.

In such an inclining and rotating table apparatus, when the driven turning shaft is driven by the drive source, the driven turning shaft turns, and a turning force of the driven turning shaft is transmitted to the rotary table device, which turns about the turning shaft. By the turning of the rotary table device, a table surface of the rotary table device is caused to incline. When the driven rotating shaft is driven by the drive source, the driven rotating shaft rotates, and a rotating force of the driven rotating shaft is transmitted to the rotary table, which rotates about the center of the rotating shaft (for example, see JP 2002-126958A).

In the above-noted inclining and rotating table apparatus, from the standpoint of reliably holding the rotary table device still, and from the standpoint of reliably holding the rotary table still, it is effective to provide clamping devices in the inclining and rotating table apparatus.

When the rotary table or the rotary table device has been positioned, these clamping devices clamp a movable section, for example, when the workpiece held by the rotary table is being machined. By doing this, it is possible to reliably keep the rotary table and the rotary table device still, and to perform high-precision machining of the workpiece.

When a clamping device is provided on an inclining and rotating table apparatus, it can be envisioned that the clamping device be provided on the turning shaft of the rotary table device or on the rotating shaft of the rotary table, that is, on the side that is caused to turn or the side that is caused to rotate (i.e., the output side).

However, if a clamping device is provided on the side that is caused to turn or the side that is caused to rotate (i.e., the output side), there are problems such as the construction of the output side becoming complex, and the output side becoming heavy.

In addition, consideration is required with regard to the construction of the clamping device. The shaft that is to be clamped is supported by a bearing or the like, and there is a possibility that misalignment of this shaft occurs. This misalignment can be, for example, axial displacements in which the axis of the shaft is displaced from the desired axis, or can be angular inclinations in which the axial orientation of the shaft is inclined from the desired axial orientation. In these cases, there is a discrepancy between the relative positions of the shaft and the clamping device. Such a discrepancy in the relative positions may also occur when there are misalignments due to displacement or inclination of the clamping device, even when there is no misalignment of the shaft. Consequently, there is a need for a clamping device that can properly clamp the shaft even in such a situation.

SUMMARY OF THE INVENTION

The present invention was made with consideration given to the above issues, and has as an object to provide an inclining and rotating table apparatus that, when a rotary table that is caused to rotate or a rotary table device that is caused incline is positioned, is capable of properly clamping a movable section.

An aspect of the present invention is an inclining and rotating table apparatus comprising a rotary table device having a driven rotating shaft driven to rotate by a first drive source, and a rotary table driven to rotate by the driven rotating shaft; a driven turning shaft for causing inclination of a table surface of the rotary table device by causing the rotary table device to turn, the driven turning shaft being driven to turn by a second drive source; and a clamping device for clamping at least one of the driven rotating shaft and the driven turning shaft.

Features and objects of the present invention other than the above will become clear by reading the description of the present specification with reference to the accompanying drawings.

BRIEF DESCRIPTION OF THE DRAWINGS

In order to facilitate further understanding of the present invention and the advantages thereof, reference is now made to the following description taken in conjunction with the accompanying drawings, wherein.

DETAILED DESCRIPTION OF THE INVENTION

Figure 1:
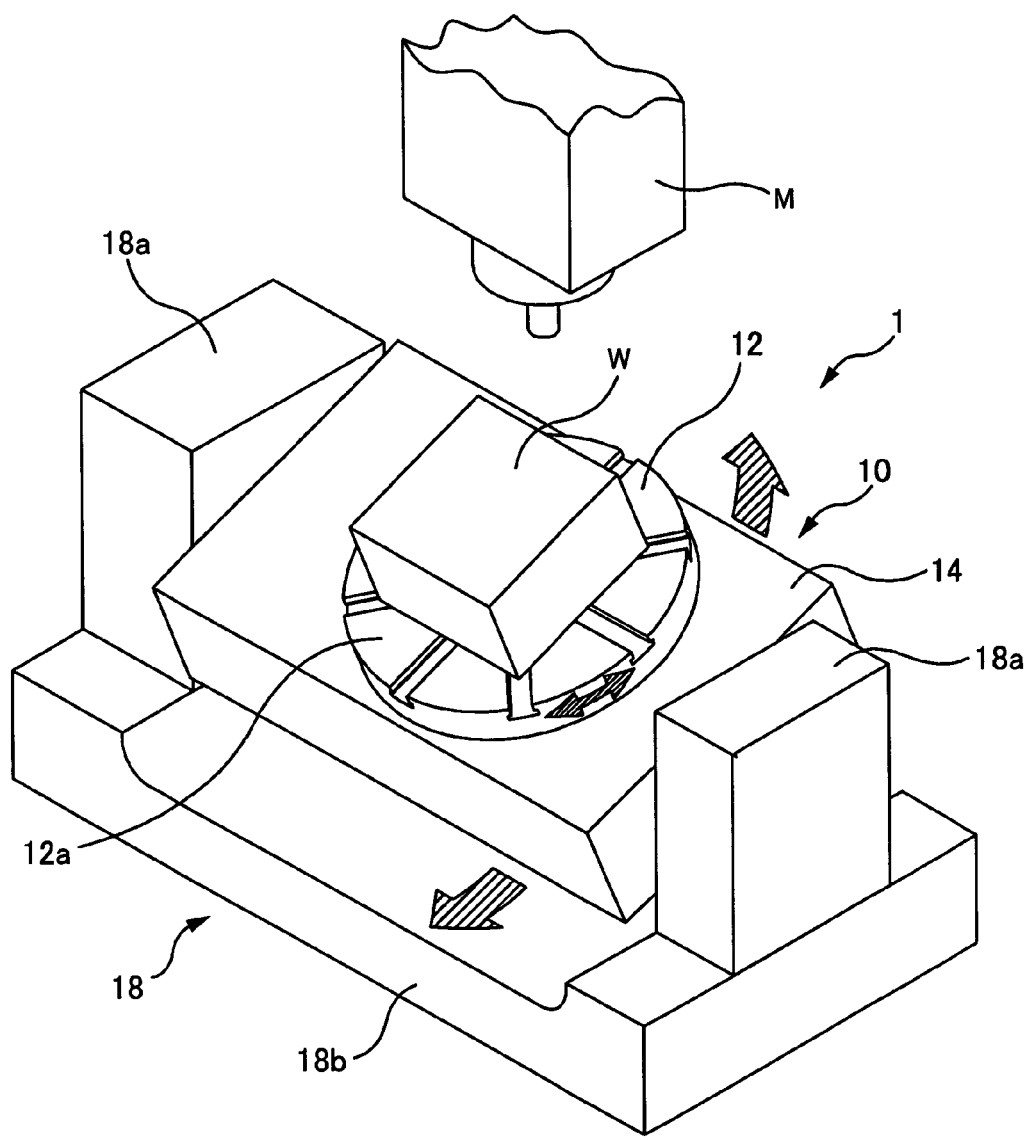
FIG. 1 is a perspective view of an inclining and rotating table apparatus 1 according to an embodiment of the present invention.

At least the following aspects will be made clear by the present specification with reference to the accompanying drawings.

An aspect of the present invention is an inclining and rotating table apparatus comprising a rotary table device having a driven rotating shaft driven to rotate by a first drive source, and a rotary table driven to rotate by the driven rotating shaft; a driven turning shaft for causing inclination of a table surface of the rotary table device by causing the rotary table device to turn, the driven turning shaft being driven to turn by a second drive source; and a clamping device for clamping at least one of the driven rotating shaft and the driven turning shaft.

In the above-noted inclining and rotating table apparatus, a clamping device is not provided on the turning shaft of the rotary table device or the rotating shaft of the rotary table, that is, it is not provided on the side caused to turn or the side caused to rotate (i.e., the output side). Rather, the clamping device is provided on at least one of the driven turning shaft that is driven by the second drive source so as to turn and the driven rotating shaft, that is, the clamping device is provided on the side that causes turning or rotation (i.e., the input side).

By providing a clamping device in this manner on the side that causes turning or causes rotation (the input side), there are the following advantages, for example.

Firstly, it is possible to simplify the construction of the area surrounding the turning shaft of the rotary table device or the area surrounding the rotating shaft of the rotary table, which is the output side, and to reduce the number of parts on the output side, thus achieving light weight. The lightening of the output side leads to an improvement in the speed of movement on the output side.

Additionally, in the case of providing a clamping device on the input side, it is possible to reduce the clamp holding torque to the extent of the reduction ratio compared to the case of providing a clamping device on the output side, the result being that it is possible to reduce the size of the inclining and rotating table apparatus.

Further, the clamping device may have a thin-walled sleeve arranged such that a gap is provided along a circumferential direction of the shaft; and the clamping device may clamp the shaft by deforming the thin-walled sleeve towards the shaft.

Further, the thin-walled sleeve may have a thickness of 5 mm or less.

According to this inclining and rotating table apparatus, it is possible to clamp the shaft properly, even if there is misalignment in the shaft or the clamping device.

Further, the clamping device may be provided for clamping both the driven rotating shaft and the driven turning shaft.

According to this inclining and rotating table apparatus, the above-described effect, that is, the effect of being able to properly clamp the shafts even in the case in which there is misalignment in the shafts or clamping device, can be achieved more advantageously.

Further, the driven rotating shaft and the driven turning shaft may each have a cam; the rotary table and the rotary table device may each have a cam follower; and using the cam and the cam follower, the rotary table may be driven to rotate by the driven rotating shaft, and the rotary table device may be driven to turn by the driven turning shaft.

According to this inclining and rotating table apparatus, it is possible to clamp the shafts more properly, even in the case in which misalignment occurs in the clamping device, the driven rotating shaft that drives the rotary table and causes it to rotate using the cam and the cam follower, or the driven turning shaft that drives the rotary table device and causes it to turn using the cam and the cam follower.

Further, the inclining and rotating table apparatus does not have to be provided with neither a dwelling period in which the rotary table does not rotate even though the driven rotating shaft is driven and rotating, nor a dwelling period in which the rotary table device does not turn even through the driven turning shaft is driven and turning.

In this case, because the driven rotating shaft and the driven turning shaft are always held in a still state when the rotary table or the rotary table device are positioned and held still, the importance of the clamping device of clamping these shafts and reliably holding still the rotary table or the rotary table device is increased. Therefore, the above-described effect, that is, the effect of being able to perform proper shaft clamping even when there is misalignment in the shafts or the clamping device, is achieved more appropriately.

Further, the clamping device may clamp the shaft by deforming the thin-walled sleeve such that the thin-walled sleeve adapts to the shape of a circumferential surface of the shaft.

According to this inclining and rotating table apparatus, since the thin-walled sleeve adapts to the shape of the circumferential surface of the shaft when the thin-walled sleeve is caused to deform, it is possible to properly clamp the shaft even when there is misalignment in the shaft or the clamping device.

Further, the thin-walled sleeve may be positioned on an outer side in a radial direction of the shaft; and the clamping device may clamp the shaft by deforming the thin-walled sleeve from the outer side in the radial direction towards the shaft.

Thus, the constitution is simplified.

Further, the clamping device may further comprise a fluid containing section for containing a fluid, the fluid containing section being arranged on the outer side in the radial direction with respect to the thin-walled sleeve; and the clamping device may deform the thin-walled sleeve by a pressure of the fluid that is filled into the fluid containing section.

Thus, it is possible to cause deformation of the thin-walled sleeve by a simple method.

Further, the thin-walled sleeve may be arranged only on an inner side in the radial direction of the shaft with respect to the fluid containing section.

If, for example, the thin-walled sleeve is provided both on the inner side and on the outer side in the radial direction of the driven shaft with respect to the fluid containing section, then the effect of the pressure of the fluid in the fluid containing section, that is, the effect of the pressure deforming the thin-walled sleeve will be distributed between the thin-walled sleeve arranged radially inward and the thin-walled sleeve arranged radially outward. On the other hand, if the thin-walled sleeve is provided only on the inner side in the radial direction of the driven shaft with respect to the fluid containing section, then the effect of the pressure is concentrated on that thin-walled sleeve, and thus, the thin-walled sleeve can be efficiently deformed.

Further, the gap may include an oil; and a surface of the shaft may be provided with a groove into which the oil flows when the clamping device clamps the shaft by deforming the thin-walled sleeve towards the shaft.

When the shaft is clamped and a large rotation load is exerted on the shaft, there is a possibility that the shaft and the thin-walled sleeve may get locked due to the friction heat occurring between the shaft and the thin-walled sleeve. The oil achieves the function of preventing the occurrence of such locking in the event that a large rotation load is exerted on the shaft. However, in ordinary situations, due to the effect of the oil provided in the gap, the shaft and the thin-walled sleeve are prone to slide against each other, and thus, there is the problem that a sufficient clamping capability cannot be attained. By providing grooves in the surface of the shaft, the oil in the gap flows into the grooves when the thin-walled sleeve clamps the shaft, and slippage between the shaft and the thin-walled sleeve is prevented, thus solving the above-noted problem.

Further, the driven rotating shaft may have a roller gear cam; the rotary table may have a cam follower; and using the roller gear cam and the cam follower, the rotary table may be driven to rotate by the driven rotating shaft without causing backlash. Further, the clamping device for clamping the shaft may be provided on the driven rotating shaft.

Considering only the halting precision of the rotary table, it may be envisioned that it is preferable to provide a clamping device on the rotary table side (output side). However, by providing a clamping device for clamping the shaft on the driven rotating shaft and making the rotary table be driven to rotate, without causing backlash, by the driven rotating shaft using the roller gear cam and the cam follower, it becomes possible to suppress an increase in the complexity of construction and weight of the rotary table side (output side), without lowering the halting precision of the rotary table.

Further, the driven turning shaft may have a roller gear cam; the rotary table device may have a cam follower; and using the roller gear cam and the cam follower, the rotary table device may be driven to turn by the driven turning shaft without causing backlash. Further, the clamping device for clamping the shaft may be provided on the driven turning shaft.

Considering only the halting precision of the rotary table device, it may be envisioned that it is preferable to provide a clamping device on the rotary table device side (output side). However, by providing a clamping device for clamping the shaft on the driven turning shaft and making the rotary table device be driven to turn, without causing backlash, by the driven turning shaft using the roller gear cam and the cam follower, it becomes possible to suppress an increase in the complexity of construction and weight of the rotary table device side (output side), without lowering the halting precision of the rotary table device.

It should be noted that the term "turn (turning; turnable)" is used herein to refer to "a circular movement of more than 0 degrees in both the clockwise and counterclockwise directions, or in either the clockwise or counterclockwise direction", and the term "rotate (rotating; rotatable)" is used herein to refer to "a circular movement of more than 0 degrees in either the clockwise or counterclockwise direction".

Example of the Constitution of an Inclining and Rotating Table Apparatus

Figure 2:
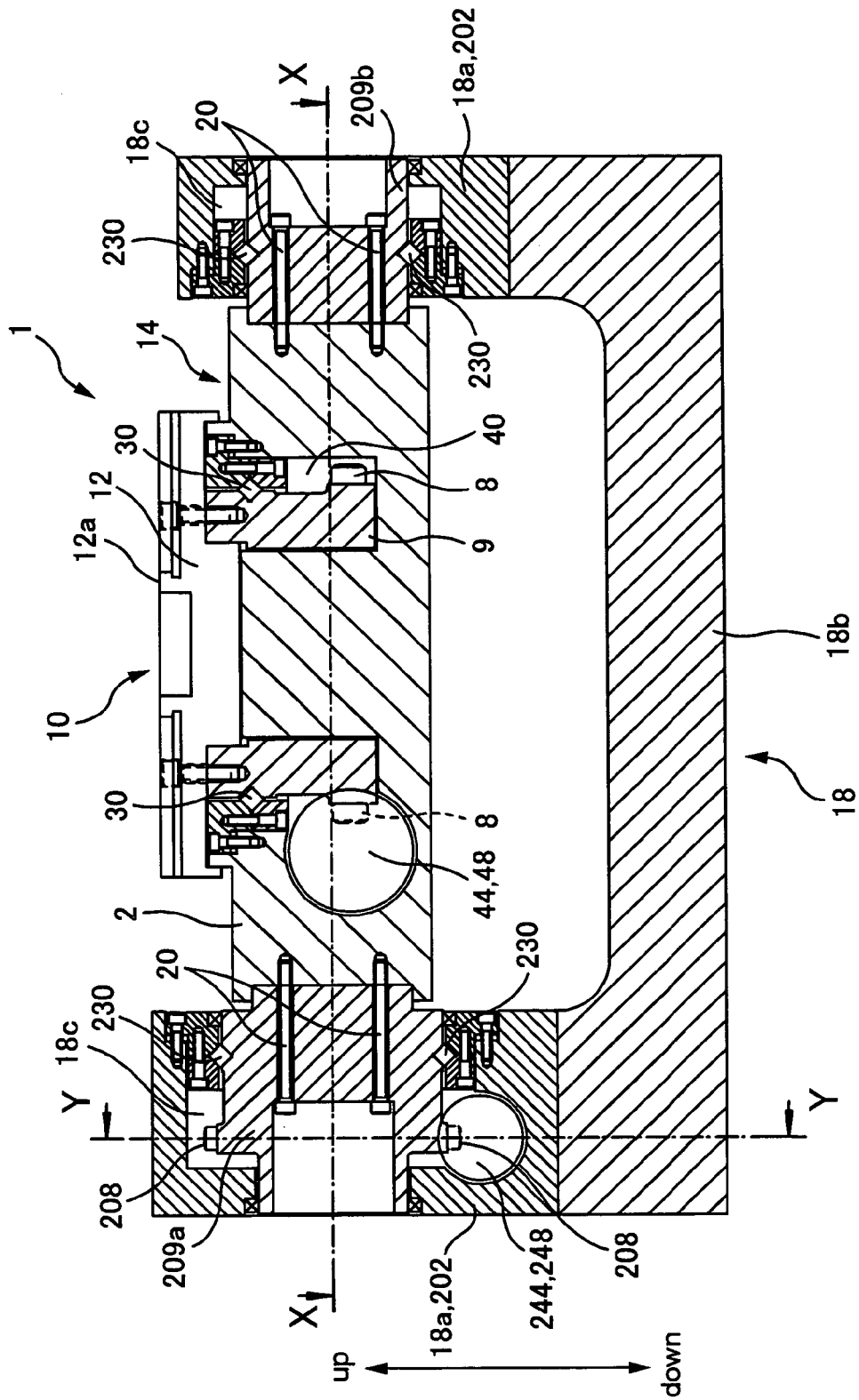
FIG. 2 is an internal structural view of the inclining and rotating table apparatus 1 according to an embodiment of the present invention.
Figure 3:
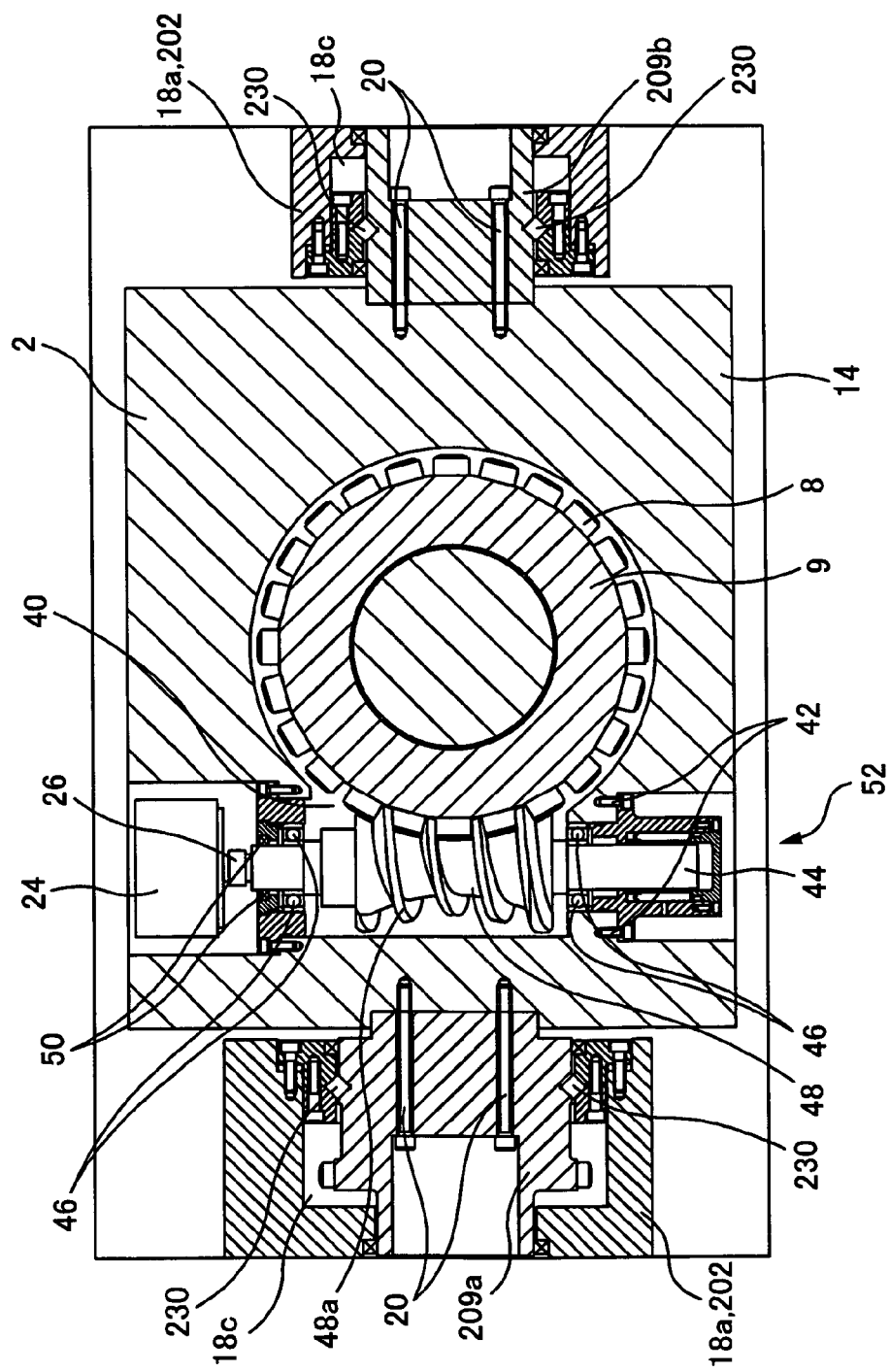
FIG. 3 is a cross-sectional view along X-X in FIG. 2.
Figure 4:
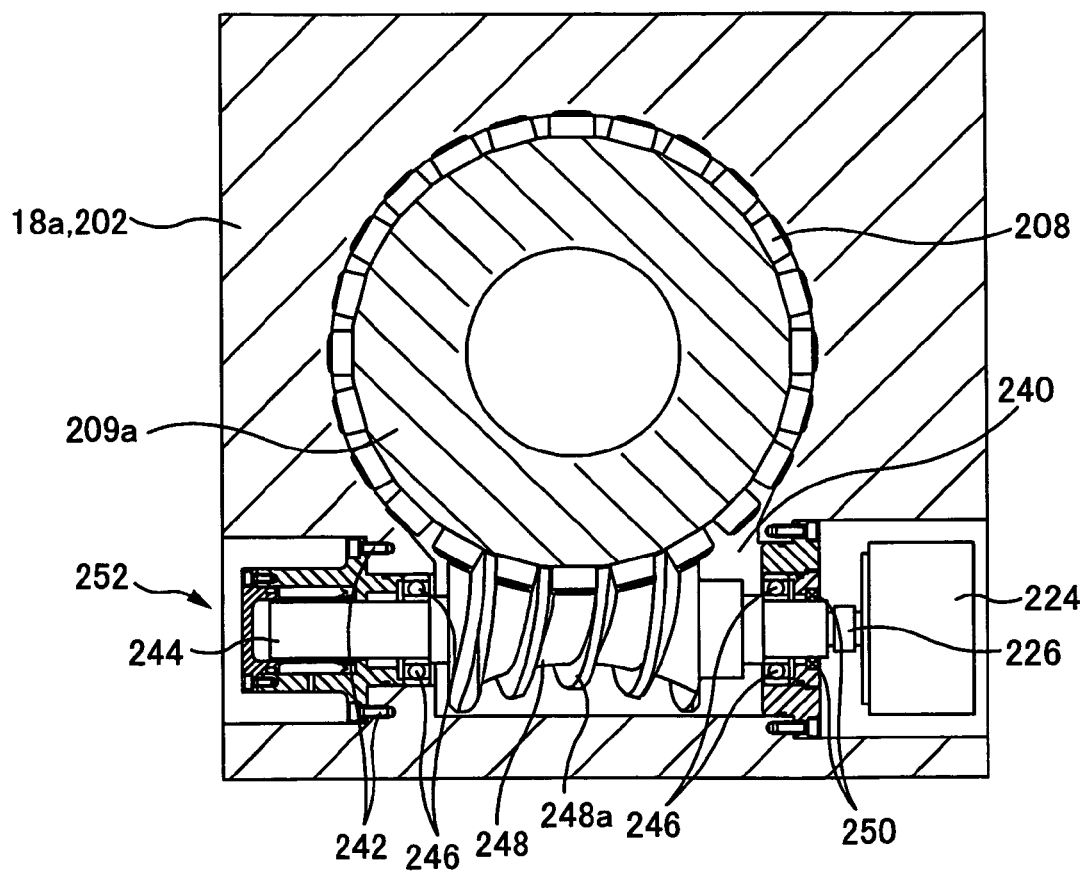
FIG. 4 is a cross-sectional view along Y-Y in FIG. 2.

Next, an example of the constitution of an inclining and rotating table apparatus 1 will be presented, with reference to FIG. 1 through FIG. 4. FIG. 1 is a perspective view of the inclining and rotating table apparatus 1 according to an embodiment of the present invention. FIG. 2 is an internal structural view of the inclining and rotating table apparatus 1 according to the present embodiment. FIG. 3 is a cross-sectional view along X-X in FIG. 2. FIG. 4 is a cross-sectional view along Y-Y in FIG. 2. It should be noted that in FIG. 2, the up and down directions are indicated by arrows. For example, the rotary table 12 has cam followers 8 at its top.

The inclining and rotating table apparatus 1 has such elements as a motor 224, as one example of a second drive source, a driven turning shaft 244 that is driven and turned by the motor 224, a rotary table device 10 driven and turned by the driven turning shaft 244, a base 18 that turnably supports the rotary table device 10, and a clamping device 252 for clamping the driven turning shaft 244.

The driven turning shaft 244 is turnably supported with respect to the housing 202 by a pair of ball bearings 246. The driven turning shaft 244 has the motor 224 fastened to one end, in the axial direction thereof, by a fastening member 226, and the drive force of the motor 224 drives the driven turning shaft 244 so as to cause the driven turning shaft to turn. The driven turning shaft 244 has a roller gear cam 248 provided on it as one example of a cam. This roller gear cam 248 is provided with a cam surface 248a whose phase shifts in the axial direction when the driven turning shaft 244 turns. In this case, the roller gear cam 248 used is a globoidal cam, which has backlash neither in the halted condition nor during indexing.

The base 18 has a base section 18b arranged below the rotary table device 10, and two device support sections 18a, provided upright above the base section 18b. The two device support sections 18a are arranged so as to sandwich the rotary table device 10 therebetween. The device support sections 18a are each provided with a hole 18c for supporting the rotary table device 10, and the base 18 turnably supports the rotary table device 10 by a pair of cross roller bearings 230 in the holes 18c.

The clamping device 252 is for clamping the driven turning shaft 244. The clamping device 252 is screwed to the housing 202 with screws 242. The constitution of the clamping device 252 is described in detail later.

The rotary table device 10 has a rotary table 12, a table base 14 for rotatably supporting the rotary table 12, and oscillating turrets 209.

The table base 14 is rectangular in shape when viewed from above, and is provided with a pair of oscillating turrets 209a and 209b, so that they protrude from two surfaces thereof perpendicular to the longitudinal direction thereof. The oscillating turrets 209a and 209b are cylindrical, and are screwed to the table base 14 by screws 20. Additionally, the shaft axis of one oscillating turret 209a is arranged on an extension of the shaft axis of the other oscillating turret 209b, and these shaft axes are arranged along a direction that is perpendicular to the rotational axis of the rotary table 12. The oscillating turrets 209a and 209b are fitted into the above-described holes 18c of the base 18, and the rotary table device 10 is turnably supported relative to the base 18.

In the lower section on the outer circumferential surface of one oscillating turret 209a, a plurality of cam followers 208 are provided arranged along the circumferential direction at uniform spacing. These cam followers 208 mate with the above-described cam surface 248a of the roller gear cam 248, so that the turning force of the driven turning shaft 244 is transmitted to the rotary table device 10 via the roller gear cam 248 and the cam followers 208. That is, using the roller gear cam 248 and the cam followers 208, the rotary table device 10 is driven and caused to turn by the driven turning shaft 244. By the turning of the rotary table device 10, the table surface 12a of the rotary table 12 is caused to tilt. Details of the rotary table 12 are presented later.

Additionally, the rotary table device 10 has a motor 24 as an example of a first drive source, a driven rotating shaft 44 that is driven and caused to rotate by the motor 24 and that drives the rotary table 12 and causes the rotary table 12 to rotate, and a clamping device 52 for clamping the driven rotating shaft 44.

The driven rotating shaft 44 is rotatably supported with respect to the housing 2 by a pair of ball bearings 46. The driven rotating shaft 44 has a motor 24 fastened to one end, in the axial direction thereof, by a fastening member 26, and the drive force of the motor 24 drives the driven rotating shaft 44 so as to cause the driven rotating shaft to rotate. The driven rotating shaft 44 has a roller gear cam 48 provided on it as one example of a cam. This roller gear cam 48 is provided with a cam surface 48a whose phase shifts in the axial direction when the driven rotating shaft 44 rotates. In this case, the roller gear cam 48 used is a globoidal cam, which has backlash neither in the halted condition nor during indexing.

The rotary table 12 plays the role of holding, on its table surface 12a, a workpiece W that is machined in a vertical machining center M or the like. This rotary table 12 is rotatably supported relative to the table base 14 by a pair of cross roller bearings 30. A cylindrical turret 9 extends downward from the lower surface of the rotary table 12, and in the lower section on the outer circumferential surface of the turret 9, a plurality of cam followers 8 are provided along the circumferential direction at uniform spacing. These cam followers 8 mate with the above-described cam surface 48a of the roller gear cam 48, so that the rotating force of the driven rotating shaft 44 is transmitted to the rotary table 12 via the roller gear cam 48 and the cam followers 8. That is, using the roller gear cam 48 and the cam followers 8, the rotary table 12 is driven and caused to rotate by the driven rotating shaft 44.

The clamping device 52 is for clamping the driven rotating shaft 44. The clamping device 52 is screwed to the housing 2 with screws 42. The constitution of the clamping device 52 is described in detail later.

It should be noted that in this embodiment of the present invention, the shape of the cam surface 48a and the like is established so that there is no period of time during which the rotary table 12 is not rotated even though the driven rotating shaft 44 is being rotationally driven, that is, so that no dwelling period occurs. With regard to the cam surface 248a as well, in the same manner, the shape thereof is established so that there is no dwelling period during which the rotary table device 10 does not turn, even though the driven turning shaft 244 is being driven to turn.

Oil is provided in the gap 40 in the housing 2, for lubricating the roller gear cam 48 and the cam followers 8. This oil is prevented from leaking to the outside of the inclining and rotating table apparatus 1 by a seal member 50 or the like. In the same manner, oil is provided in the gap 240 in the housing 202, for lubricating the roller gear cam 248 and the cam followers 208. This oil is prevented from leaking to the outside of the inclining and rotating table apparatus 1 by a seal member 250 or the like.

Next, the operation of the inclining and rotating table apparatus 1 constituted as above is described below.

When the driven turning shaft 244 is driven by the motor 224, the driven turning shaft 244 turns with respect to the housing 202. When the driven turning shaft 244 turns, the roller gear cam 248 also turns, and the cam followers 208 meshed therewith successively mate with the cam surface 248a, so that the turning force is transmitted to the rotary table device 10, thereby turning the rotary table device 10 about the center of turning of the oscillating turrets 209. By the turning of the rotary table device 10, the table surface 12a of the rotary table 12, which holds a workpiece W, tilts. When the rotary table device 10 is positioned (for example, when machining a workpiece W held on the rotary table 12), the driven turning shaft 244 is clamped by the clamping device 252.

On the other hand, when the driven rotating shaft 44 is driven by the motor 24, the driven rotating shaft 44 rotates with respect to the housing 2. When the driven rotating shaft 44 rotates, the roller gear cam 48 also rotates, and the cam followers 8 meshed therewith successively mate with the cam surface 48a, so that the rotating force is transmitted to the rotary table 12, thereby rotating the rotary table 12 about the center of rotation of the turret 9. When the rotary table 12 is positioned (for example, when machining a workpiece W held on the rotary table 12), the driven rotating shaft 44 is clamped by the clamping device 52.

About the Clamping Device

Figure 5:
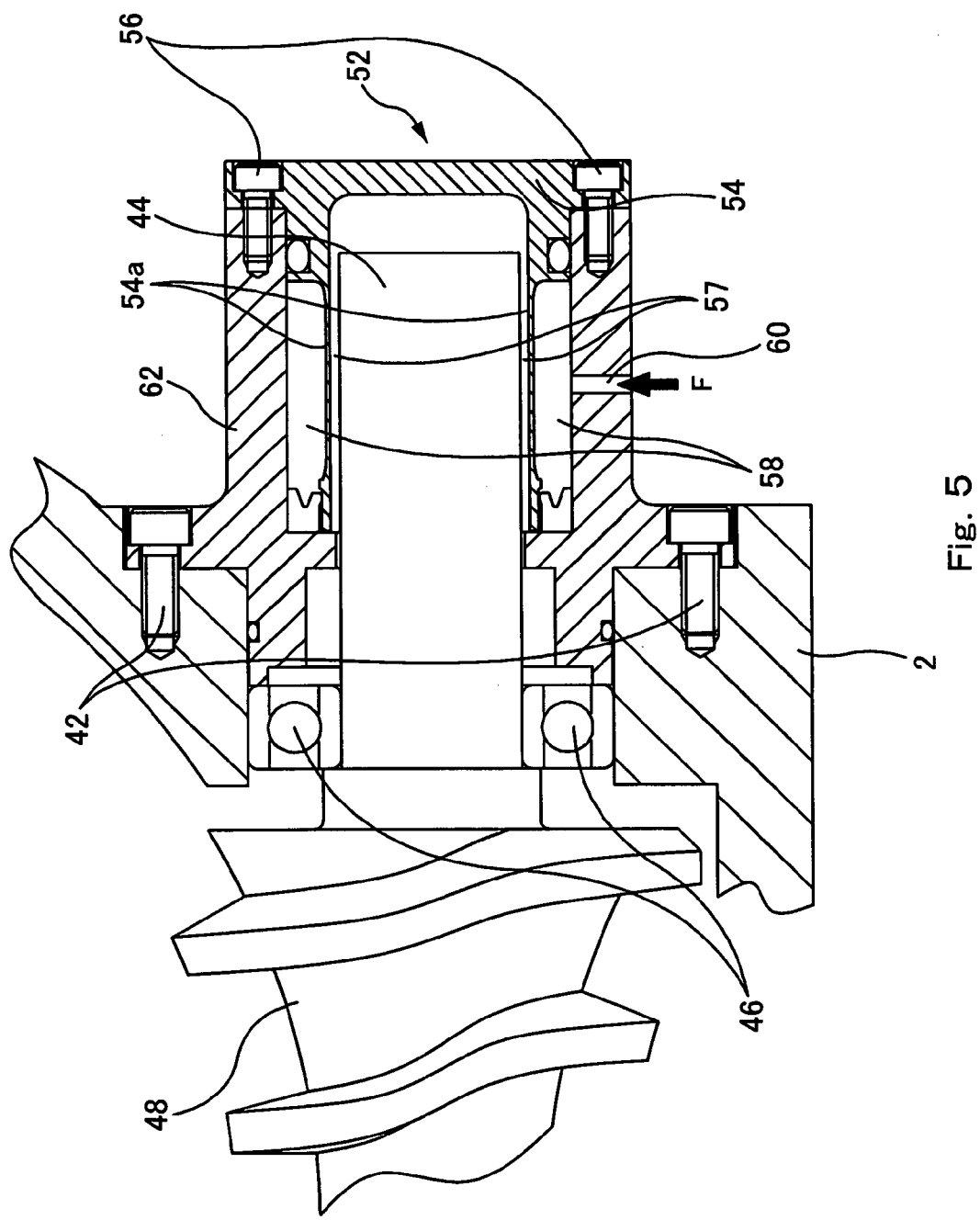
FIG. 5 is an enlarged view of a clamping device.
Figure 6A:
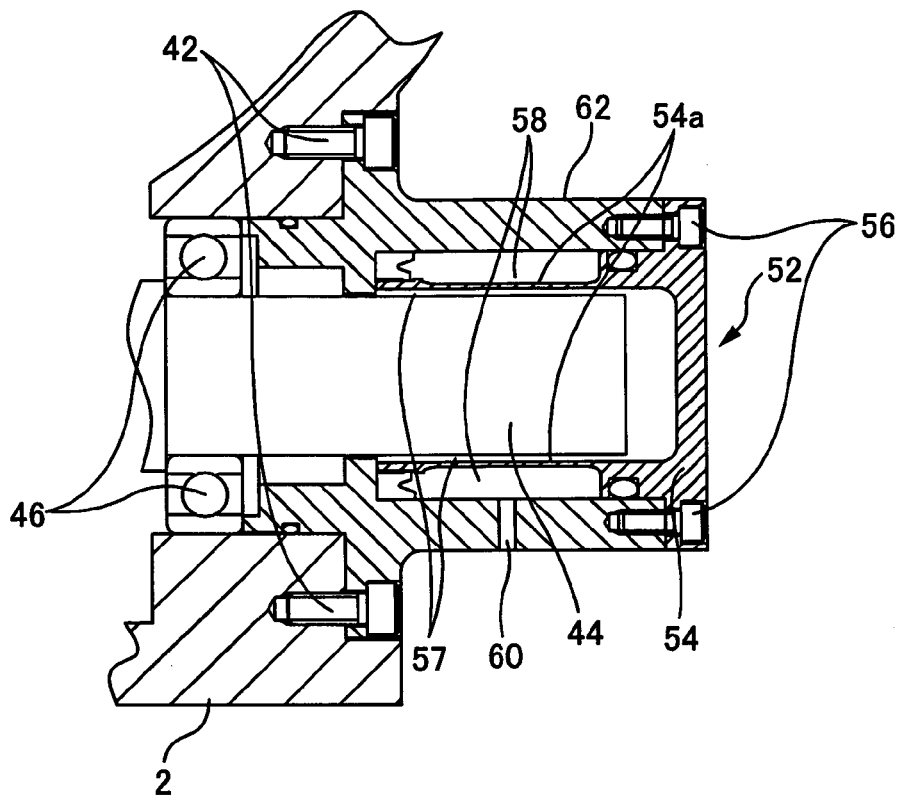
FIG. 6A and FIG. 6B are diagrams for explaining the operation of the clamping device.
Figure 6B:
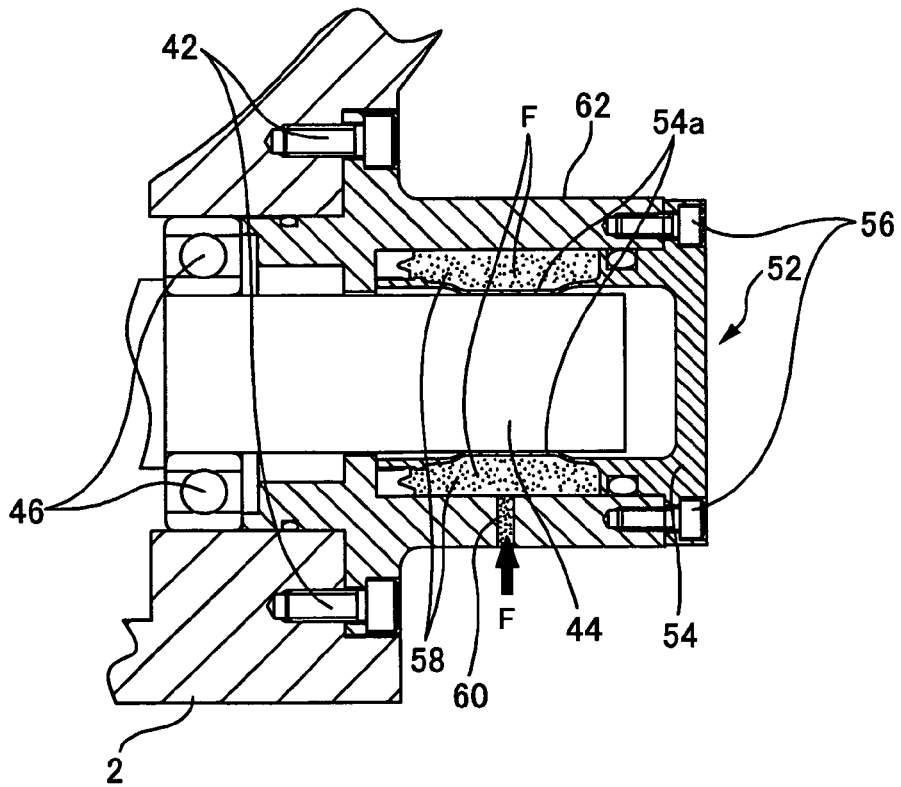

A configuration example and an operation example of the clamping device are described below with reference to FIGS. 5, 6A and 6B. FIG. 5 is an enlarged view of the clamping device. FIGS. 6A and 6B are diagrams illustrating the operation of the clamping device. It should be noted that as described above, the inclining and rotating table apparatus 1 according to an embodiment of the present invention has a clamping device 52 for clamping the driven rotating shaft 44 and a clamping device 252 for clamping the driven turning shaft 244. Because the constitution and operation of these clamping devices 52 and 252 are similar, the description which follows is presented with regard to the clamping device 52 for clamping the driven rotating shaft 44.

Configuration Example of Clamping Device 52

First, a configuration example of the clamping device 52 is explained with reference to FIG. 5.

The clamping device 52 includes, for example, a clamper 54, a thin-walled sleeve 54a, a fluid containing section 58, a fluid filling port 60, and a casing 62.

The clamper 54 clamps the driven rotating shaft 44 by deformation towards the driven rotating shaft 44. The clamper 54 is provided with a thin-walled sleeve 54a (described below), and is screwed with screws 56 to the casing 62.

The thin-walled sleeve 54a is a thin-walled member made of metal having a hollow cylindrical shape, and is not more than 5 mm thick. This thin-walled sleeve 54a is arranged along the circumferential direction of the driven rotating shaft 44, such that a gap 57 is provided on the radially outer side of the driven rotating shaft 44. Moreover, the thin-walled sleeve 54a is so thin that it can be deformed. That is to say, the thin-walled sleeve 54a can be deformed from the outer side, in the radial direction, of the driven rotating shaft 44 toward the driven rotating shaft 44. When deforming, the thin-walled sleeve 54a adapts to the shape of the circumferential surface of the driven rotating shaft 44, so that the driven rotating shaft 44 can be clamped securely. It should be noted that the thin-walled sleeve 54a is provided only on the inner side in the radial direction of the driven rotating shaft 44 with respect to the fluid containing section 58 (explained below), and is not provided on the outer side etc. in the radial direction of the driven rotating shaft 44 with respect to the fluid containing section 58.

The fluid containing section 58 is arranged adjacent to the thin-walled sleeve 54a, on the outer side in the radial direction of the driven rotating shaft 44 with respect to the thin-walled sleeve 54a. This fluid containing section 58 can contain a fluid F, for example, a liquid such as water or oil, or a gas such as air. The pressure of the fluid F that is filled into the fluid containing section 58 deforms the thin-walled sleeve 54a adjacent to the fluid containing section 58, whereby the driven rotating shaft 44 is clamped.

The casing 62 has the function to contain the clamper 54 etc. This casing 62 is arranged adjacent to the fluid containing section 58, on the outer side in the radial direction of the driven rotating shaft 44 with respect to the fluid containing section 58. As explained above, the clamper 54 is screwed to this casing 62. Moreover, the casing 62 is provided with a fluid filling port 60 for filling the fluid F into the fluid containing section 58. The fluid F is filled from a fluid transmission device (not shown in the drawings) via the fluid filling port 60 into the fluid containing section 58.

Operation Example of the Clamping Device 52

An operation example of the clamping device 52 is described below with reference to FIGS. 6A and 6B. FIG. 6A is a sectional view showing the state of the driven rotating shaft 44 and the clamping device 52 when the clamping device 52 is not clamping the driven rotating shaft 44. FIG. 6B is a sectional view showing the state of the driven rotating shaft 44 and the clamping device 52 when the clamping device 52 is clamping the driven rotating shaft 44.

As described above, when the driven rotating shaft 44 is driven by the motor 24, the driven rotating shaft 44 rotates with respect to the housing 2, and the rotational force from this rotation is transmitted to the rotary table 12, thereby rotating the rotary table 12 around the rotation axis of the turret 9. In this situation, clamping with the clamping device 52 is not performed, so as not to hinder the rotation of the driven rotating shaft 44. That is to say, when the driven rotating shaft 44 rotates, the clamping device 52 is maintained in the state shown in FIG. 6A.

Then, when the driven rotating shaft 44 is halted and the rotary table 12 has been positioned, the clamping device 52 operates as follows, in order to clamp the driven rotating shaft 44 (see FIG. 6B).

First, the fluid F is filled from a fluid transmission device (not shown in the drawings) through the fluid filling port 60 into the fluid containing section 58. The fluid F that has been filled into the fluid containing section 58 exerts a pressure on the thin-walled sleeve 54 adjacent to the fluid containing section 58, and this pressure of the fluid F deforms the thin-walled sleeve 54a from the outer side in the radial direction of the driven rotating shaft 44 towards the driven rotating shaft 44. That is to say, the gap 57 (see FIG. 6A), which is located between the thin-walled sleeve 54a and the driven rotating shaft 44 before the fluid F is filled into the containing portion 58, disappears due to the deformation of the thin-walled sleeve 54a (see FIG. 6B), and the thin-walled sleeve 54a adapts to the shape of the circumferential surface of the driven rotating shaft 44. Then, the thin-walled sleeve 54a presses against the driven rotating shaft 44, thereby clamping the driven rotating shaft 44. When the driven rotating shaft 44 is clamped in this manner, the positioned rotary table 12 is reliably held still. Consequently, if the workpiece W is machined in this situation, then it is possible to machine the workpiece with high precision.

Then, when the rotary table device 10 is to rotate the rotary table 12 again, the clamping of the driven rotating shaft 44 by the clamping device 52 is released through the following operation.

First, the fluid F is discharged from the fluid containing section 58. By discharging the fluid F, the pressure exerted on the thin-walled sleeve 54a is lowered, and the thin-walled sleeve 54a is deformed and returned from the state shown in FIG. 6B to the state shown in FIG. 6A. That is to say, the gap 57 that was not present in the state shown in FIG. 6B reappears as shown in FIG. 6A, so that the clamping of the driven rotating shaft 44 is released. When the clamping of the driven rotating shaft 44 is released, the driven rotating shaft 44 can be rotationally driven by the motor 24 without hindrance, and the rotary table 12 can be appropriately rotated.

About the Effectiveness of the Clamping Device 52 According to the Present Embodiment With Regard to a Misaligned Driven Rotating Shaft 44

As described above, the clamping device 52 according to the present embodiment includes a thin-walled sleeve 54a that is provided such that there is a gap 57 along the circumferential direction of the driven rotating shaft 44, and the driven rotating shaft 44 is clamped by deforming the thin-walled sleeve 54a towards the driven rotating shaft 44. Thus, even when there-are misalignments in the driven rotating shaft 44 and/or the clamping device 52, the driven rotating shaft 44 can still be properly clamped.

Figure 7A:
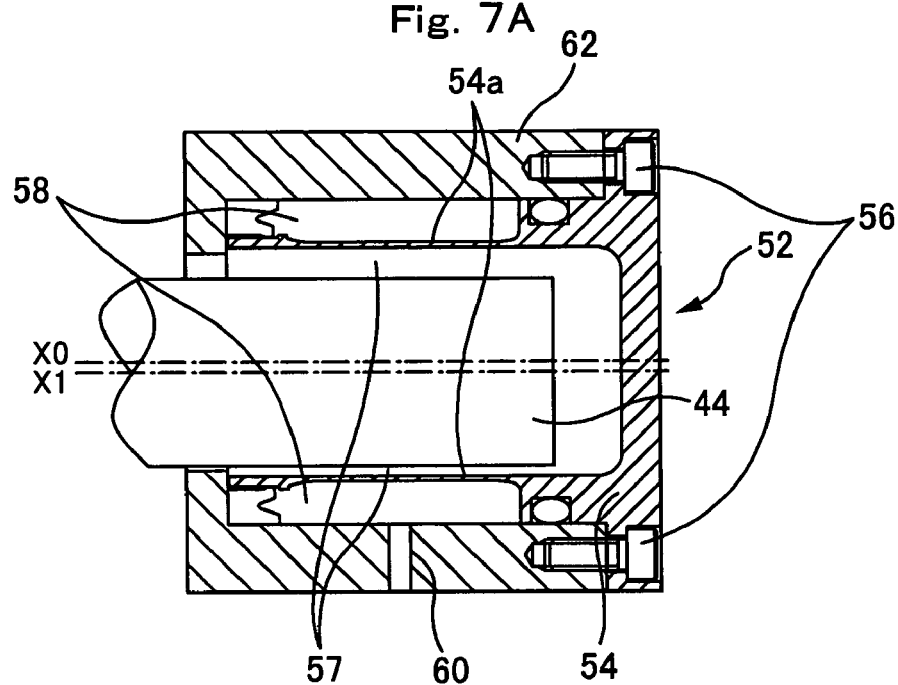
FIG. 7A and FIG. 7B are cross-sectional views showing the condition of a driven rotating shaft 44 and a clamping device 52 when the driven rotating shaft is off center.
Figure 7B:
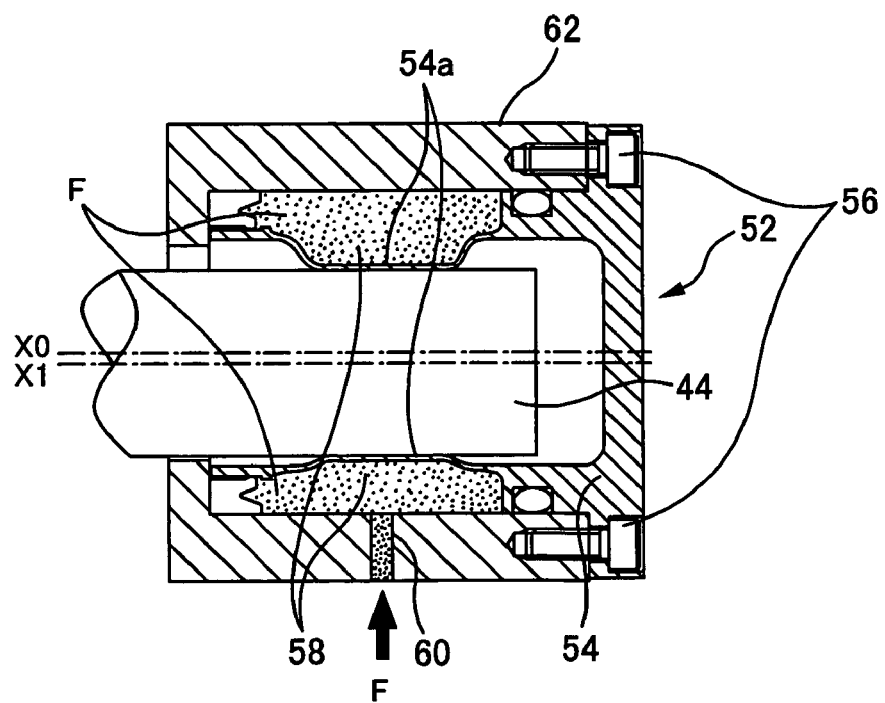
Figure 8A:
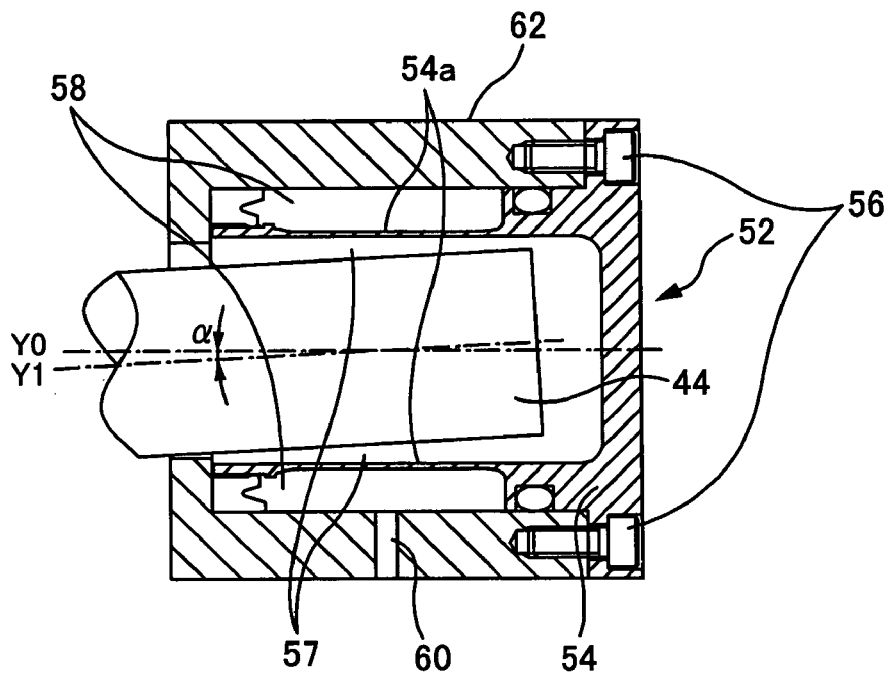
FIG. 8A and FIG. 8B are cross-sectional views showing the condition of the driven rotating shaft 44 and the clamping device 52 when the driven rotating shaft is inclined.
Figure 8B:
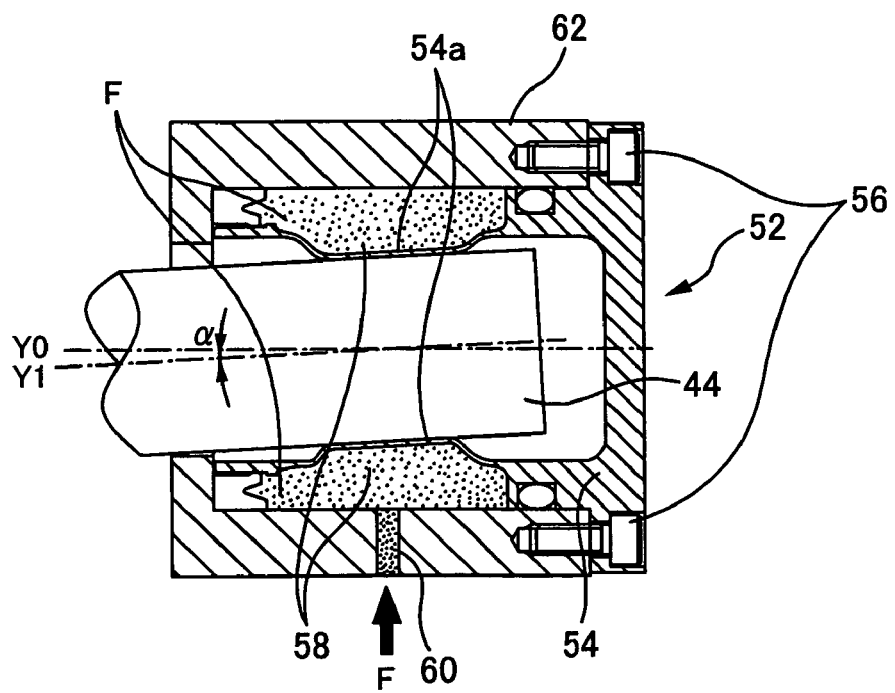

This aspect is explained with reference to FIGS. 7A to 8B. FIGS. 7A and 7B are sectional views showing the state of the driven rotating shaft 44 and the clamping device 52 when the driven rotating shaft 44 is off center. FIGS. 8A and 8B are sectional views showing the state of the driven rotating shaft 44 and the clamping device 52 when the driven rotating shaft 44 is inclined. FIGS. 7A and 8A show the state of the driven rotating shaft 44 and the clamping device 52 when the driven rotating shaft 44 is not clamped by the clamping device 52, whereas FIGS. 7B and 8B show the state of the driven rotating shaft 44 and the clamping device 52 when the driven rotating shaft 44 is clamped by the clamping device 52.

As explained in the section of the "Description of the Related Art" etc., the driven rotating shaft 44 is supported rotatably by the pair of ball bearings 46, but there is a possibility that misalignments may occur in the driven rotating shaft 44. For example, as shown in FIG. 7A, an axial displacement may occur in which the axis (marked "X1" in the figure) of the driven rotating shaft 44 is displaced from the desired axis (marked "X0" in the figure). Or, as shown in FIG. 8A, an angular inclination (marked "α" in the figure) may occur in which the axial orientation (marked "Y1" in the figure) of the driven rotating shaft 44 is inclined from the desired axial orientation (marked "Y0" in the figure). In these cases, there is a discrepancy between the relative positions of the driven rotating shaft 44 and the clamping device 52. Moreover, although not shown in the diagrams, such a discrepancy in the relative positions may also occur when there are misalignments due to displacement or inclination of the clamping device 52, even when there is no misalignment of the driven rotating shaft 44. In view of the above, there is a need for a clamping device 52 that can properly clamp the driven rotating shaft 44 even in these situations.

The clamping device 52 according to the present embodiment is provided with a thin-walled sleeve 54a that is arranged such that there is a gap 57 along the circumferential direction of the driven rotating shaft 44, and the driven rotating shaft 44 is clamped by-deforming this thin-walled sleeve 54a towards the driven rotating shaft 44. In this way, the above-mentioned need is fulfilled. That is to say, the clamping device 52 clamps the driven rotating shaft 44 by deforming the thin-walled sleeve 54a, but the thin-walled sleeve 54a is so thin that its degree of freedom of deformation is very high. Consequently, even when there is a misalignment such as axial displacement or angular inclination of the driven rotating shaft 44 as shown in FIGS. 7B and 8B, or if there is a misalignment such as axial displacement or angular inclination of the clamping device 52, the thin-walled sleeve 54a can easily adapt to the shape of the circumferential surface of the driven rotating shaft 44, and thus, the driven rotating shaft 44 is properly clamped in a state maintaining the misalignment, without suffering an inadequate load from the clamping device 52. It should be noted that in order to achieve the above-described effect, it is preferable that the thickness of the thin-walled sleeve 54a is 5 mm or less.

It should be noted that in the present specification, although the effectiveness of the clamping device 52 in clamping the driven rotating shaft 44 was described in the case in which a misalignment occurred in the driven rotating shaft 44 and/or the clamping device 52, it goes without saying that the clamping device 252 for clamping the driven turning shaft 244 achieves the same type of effect with respect to the driven turning shaft 244 when a misalignment occurs in the driven turning shaft 244 and/or the clamping device 252.

OTHER EMBODIMENTS

Above, an inclining and rotating table apparatus of the present invention was described with reference to an embodiment thereof, but the foregoing embodiment of the present invention is merely to facilitate the understanding of the present invention, and does not limit the present invention. Needless to say, changes and modifications of the present invention are possible without deviating from the spirit of the invention, and equivalents are intended to be embraced therein.

The foregoing embodiment gave a description about an example of applying the above-described clamping devices 52 and 252 to the driven rotating shaft 44 and the driven turning shaft 244 of an inclining and rotating table 1 that is provided with rotary table device 10 having a driven rotating shaft 44 driven to rotate by a first drive source such as a motor 24 and a rotary table 12 driven to rotate by the driven rotating shaft 44, and a driven turning shaft 244 driven to turn by a second drive source such as a motor 224, wherein the driven turning shaft 244 causes the rotary table device 10 to turn so as to make the table surface 12a of the rotary table device 10 tilt, and wherein cams, such as the roller gear cams 48 and 248, and cam followers 8 and 208 are used so that the rotary table 12 is driven by the driven rotating shaft 44 so as to rotate and also the rotary table device 10 is driven by the driven turning shaft 244 so as to turn.

Figure 9:
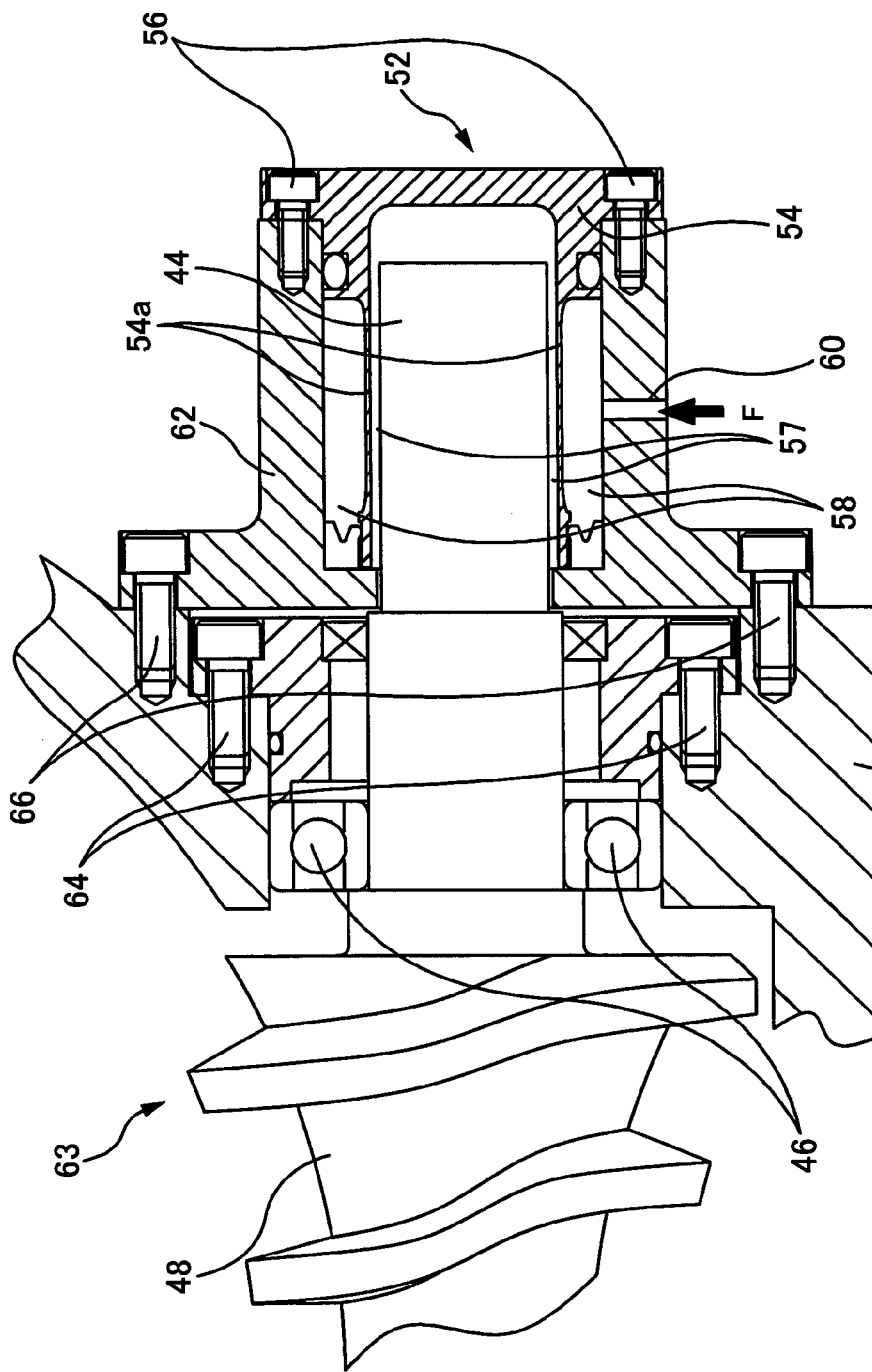
FIG. 9 is a diagram showing an inclining and rotating table apparatus 63 according to a first modification example.
Figure 10:
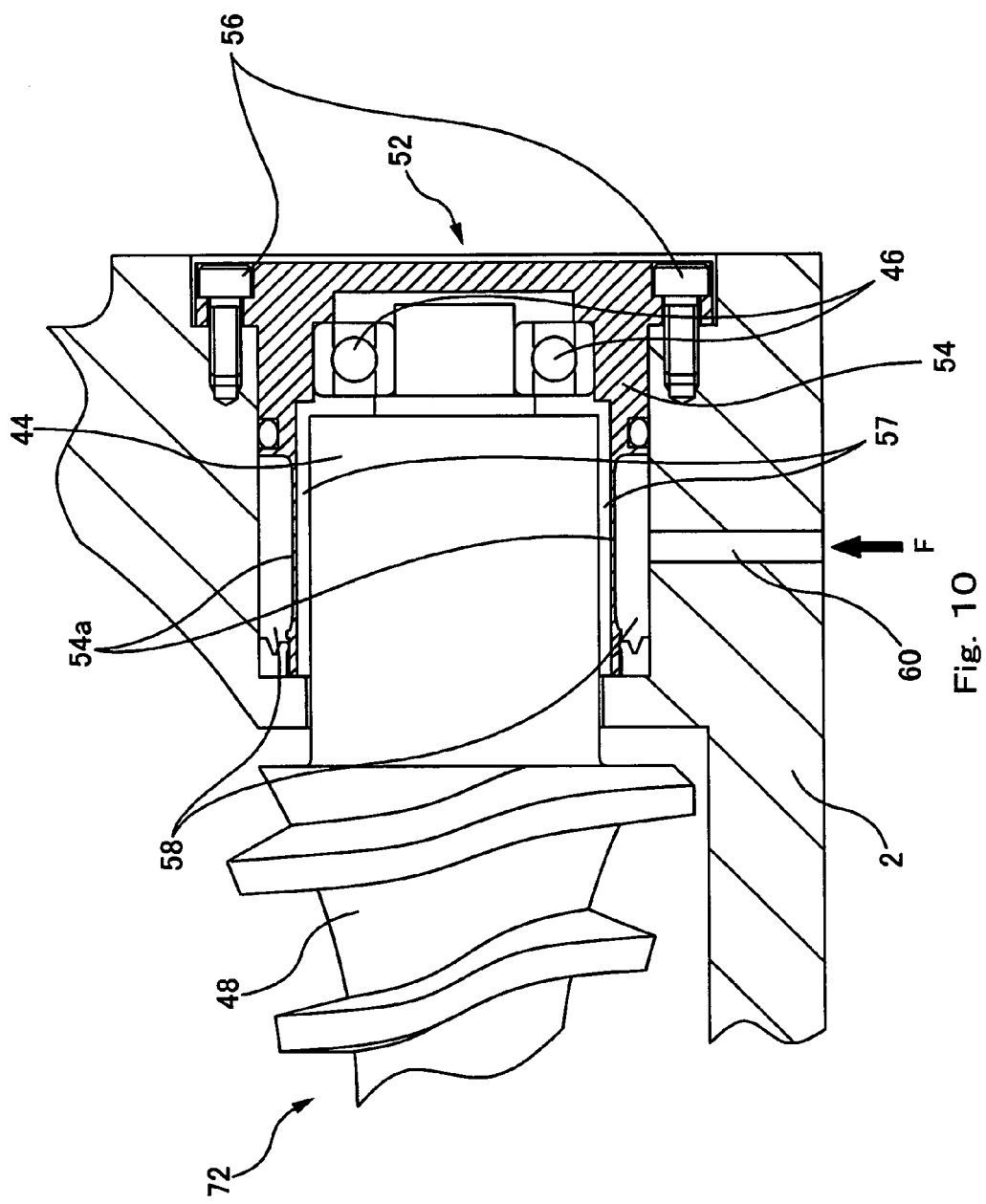
FIG. 10 is a diagram showing an inclining and rotating table apparatus 72 according to a second modification example.
Figure 11:
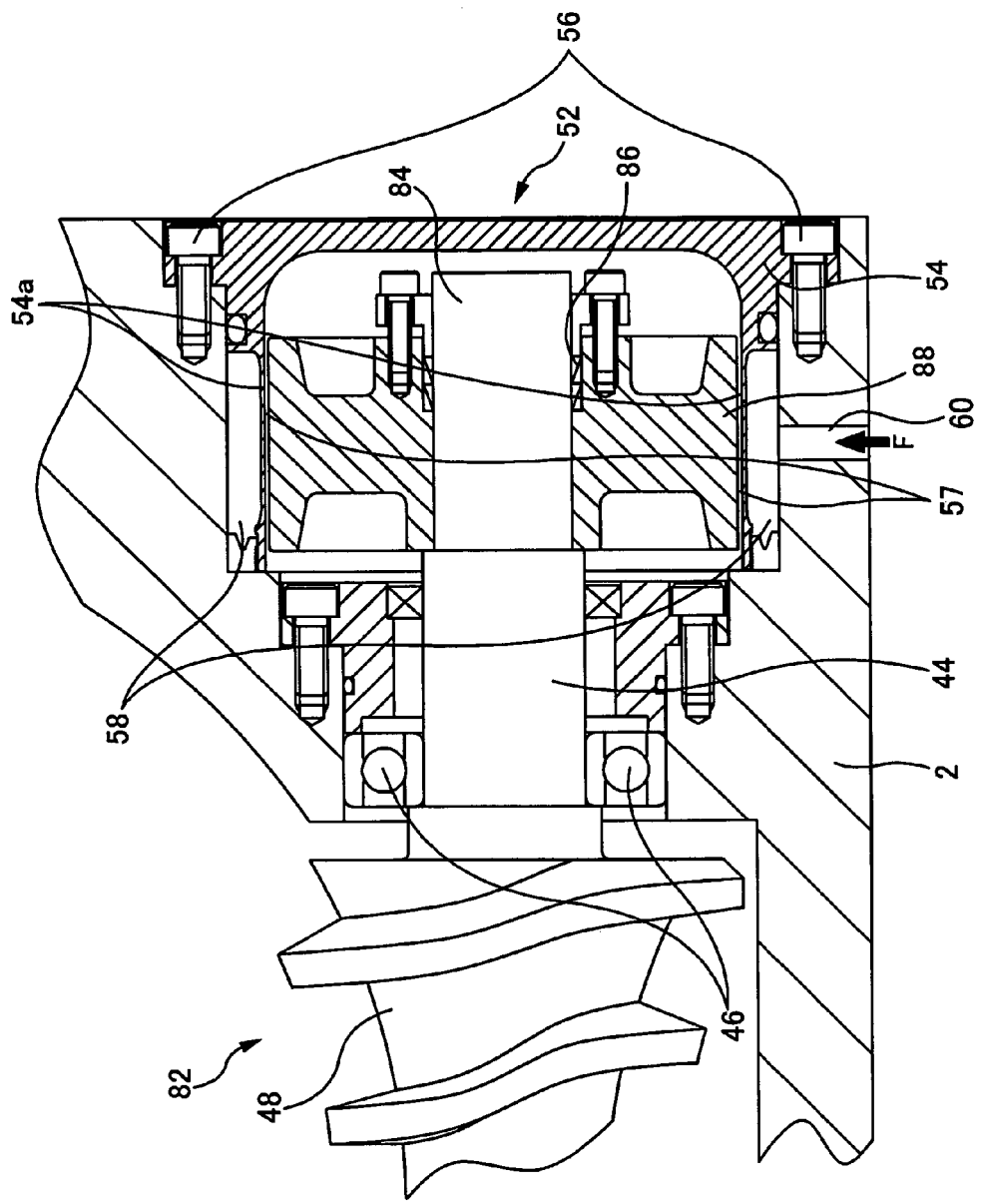
FIG. 11 is a diagram showing an inclining and rotating table apparatus 82 according to a third modification example.

Modification examples of this are explained with reference to FIGS. 9 to 11. In the following, only examples of applying the clamping device 52 to the driven rotating shaft 44 are described, but these examples can also be adopted when applying the clamping device 252 to the driven turning shaft 244.

First of all, a first modification example is explained with reference to FIG. 9. In the foregoing embodiment, the clamping device 52 is screwed with the pair of screws 42 to the housing 2, whereas in this first modification example, it is screwed to the housing 2 with two pairs of screws 64 and 66. Of these, the screws 66 can be easily attached and removed, so that the inclining and rotating table apparatus 63 of this first modification example has the advantage that the essential portions of the clamping device 52 can be easily attached to and removed from the housing 2. Also with this inclining and rotating table apparatus 63, by clamping the driven rotating shaft 44 with the above-described clamping device 52, the driven rotating shaft 44 can be properly clamped even when there are misalignments of the driven rotating shaft 44 or the clamping device 52.

A second modification example is described with reference to FIG. 10. In this second modification example, the diameter of the driven rotating shaft 44 of an inclining and rotating table apparatus 72 is larger than the diameter of the driven rotating shaft 44 of the inclining and rotating table apparatus 1 according to the above-described embodiment. Thus, the inclining and rotating table apparatus 72 according to this second modification example has the advantage that the holding torque with which the clamping device 52 holds the driven rotating shaft 44 can be increased. Moreover, because the diameter of the driven rotating shaft 44 has been increased, the spatial arrangement is such that the ball bearing 46 for supporting the driven rotating shaft 44 is arranged at a position that is different from the position of the ball bearing 46 of the inclining and rotating table apparatus 1 according to the above-described embodiment. Also with this inclining and rotating table apparatus 72, by clamping the driven rotating shaft 44 with the above-described clamping device 52, the driven rotating shaft 44 can be properly clamped even when there are misalignments of the driven rotating shaft 44 or the clamping device 52.

Next, a third modification example is explained with reference to FIG. 11. In this third modification example, like in the second modification example, in order to increase the holding torque with which the clamping device 52 holds the driven rotating shaft 44, the diameter of the driven rotating shaft 44 of an inclining and rotating table apparatus 82 is made larger than the diameter of the driven rotating shaft 44 of the inclining and rotating table apparatus 1 according to the above-described embodiment. However, whereas the large diameter portion of the driven rotating shaft 44 of the inclining and rotating table apparatus 72 according to the second modification example was configured from a single member, the large diameter portion of the driven rotating shaft 44 of the inclining and rotating table apparatus 82 according to the third modification example is made of two members. That is to say, the driven member 44 is made of a shaft section 84 having the same shape as the driven rotating shaft of the inclining and rotating table apparatus 63 according to the first modification example, and a brake rotor 88 that is fastened by a fastening member 86 to the shaft section 84 in order to increase the diameter of the driven rotating shaft 44. Also with this inclining and rotating table apparatus 82, by clamping the driven rotating shaft 44 with the above-described clamping device 52, the driven rotating shaft 44 can be properly clamped even when there are misalignments of the driven rotating shaft 44 or the clamping device 52.

Further, although the clamping devices 52 and 252 described in the above-noted embodiment are the most preferable, the constitution of the clamping device is not limited to that described in the above-noted embodiment.

Regardless of the type of clamping device, there are, for example, the following benefits by providing the clamping device on at least one of the driven turning shaft that is driven to turn by the second drive source and the above-noted driven rotating shaft, that is, on the side that causes rotation or turning (i.e., the input side), rather than providing the clamping device on the turning shaft of the rotary table device or on the rotating shaft of the rotary table, that is, on the turning side or rotated side (i.e., the output side).

First, it is possible to simplify the construction in the area of the turning shaft of the rotary table device 10 and the rotating shaft of the rotary table, which are on the output side, and it becomes possible to reduce the number of parts on the output side, thereby achieving a weight reduction. The reduction of weight on the output side leads to an improvement in the speed of movement on the output side. Additionally, in the case of providing a clamping device on the input side, it is possible to reduce the clamp holding torque to the extent of the reduction ratio compared to the case of providing a clamping device on the output side, the result being that it is possible to reduce the size of the inclining and rotating table apparatus 1.

In particular, in the above-noted embodiment, because a roller gear cam 48 and cam followers 8 are used to drive and cause rotation of the rotary table 12 by the driven rotating shaft 44 without generation of backlash and also the clamping device 52 for clamping the driven rotating shaft 44 is provided thereon, it is possible to suppress an increase in the complexity of construction and weight of the rotary table side (output side), without lowering the halting precision of the rotary table 12.

Further, by using a roller gear cam 248 and cam followers 208 so that the rotary table device 10 is driven so as to turn by the driven turning shaft 244 without causing backlash, and also providing the clamping device 252 for clamping the driven turning shaft 244 thereon, it is possible to suppress an increase in the complexity of construction and weight of the rotary table device side (output side), without lowering the halting precision of the rotary table device 10.

Further, in the above-noted embodiment, the description was about an example in which the above-described clamping devices 52 and 252 are applied to the driven rotating shaft 44 and the driven turning shaft 244 of the inclining and rotating table apparatus 1 wherein cams, such as roller gear cams 48 and 248, and cam followers 8 and 208 are used so that the rotary table 12 is driven by the driven rotating shaft 44 so as to rotate and also the rotary table device 10 is driven by the driven turning shaft 244 so as to turn. This, however, is not a limitation. For example, it is possible to apply the above-noted clamping devices 52 and 252 to the driven rotating shaft 44 and the driven turning shaft 244 of an inclining and rotating table apparatus 1 that is configured such that worm wheels are mounted to the rotary table 12 and to the rotary table device 10 and are meshed with worms, and the rotation of the worms causes the rotary table 12 to be driven and rotated and the rotary table device 10 to be driven and turned.

Further, in the above-noted embodiment, the clamping devices 52 and 252 for clamping the shafts are provided on both the driven rotating shaft 44 and the driven turning shaft 244. This, however, is not a limitation, and it is also possible to provide a clamping device on only one of the shafts.

However, the above-noted embodiment is preferable in terms of better achieving the above-noted effect, that is, the effect of allowing proper clamping of the shaft even if a misalignment occurs in the shaft or the clamping device.

Further, in the inclining and rotating table apparatus 1 in the above-noted embodiment, there is neither a dwelling period during which the rotary table 12 does not rotate even though the driven rotating shaft 44 is driven and caused to rotate, nor a dwelling period during which the rotary table device 10 does not turn even though the driven turning shaft 244 is driven and caused to turn. This, however, is not a limitation, and it is alternatively possible to provide these dwelling periods.

However, in a case in which the inclining and rotating table apparatus 1 does not have a dwelling period, because the driven rotating shaft 44 and driven turning shaft 244 are always held still when the rotary table 12 and the rotary table device 10 are held still and positioned, the importance of the clamping devices 52 and 252 in clamping these shafts and reliably keeping the rotary table 12 and the rotary table device 10 still is increased. Therefore, the above-noted embodiment is more preferable from the standpoint of achieving the above-described effect, that is, the effect of being able to properly clamp the shafts 44 and 244 even if a misalignment occurs in the shafts 44 and 244 or the clamping devices 52 and 252.

Further, in the above-noted embodiment, the thin-walled sleeve 54a is arranged on the outer side in the radial direction of the shafts 44 and 244, and the clamping devices 52 and 252 cause the thin-walled sleeve 54a to deform towards the shafts 44 and 244 from the radially outward direction so as to clamp the shafts 44 and 244. This, however, is not a limitation. For example, it is also possible to have the shaft be hollow in shape, to position the thin-walled sleeve on the inside of the shaft in the radial direction, and to cause the deformation of the thin-walled sleeve towards the shaft from the radially inward direction so as to clamp the shaft.

However, the above-noted embodiment is more preferable from the standpoint of simplicity of the constitution.

Further, in the above-noted embodiment, the clamping device 52, 252 has a fluid containing section 58 for holding a fluid on the outside in the radial direction with respect to the thin-walled sleeve 54a, and the pressure of the fluid F injected into the fluid containing section 58 causes deformation of the thin-walled sleeve 54a. This, however, is not a limitation. For example, it is possible to configure the thin-walled sleeve using a piezo-electric element, and to apply a voltage to the piezo-electric element so as to cause the thin-walled sleeve to deform.

However, the above-noted embodiment is more preferable from the standpoint of being able to cause the thin-walled sleeve to deform using a simple method.

Further, in the above-noted embodiment, the thin-walled sleeve 54a is provided only on the inner side in the radial direction of the shafts 44 and 244 with respect to the fluid containing section 58. This, however, is not a limitation. For example, it is also possible to provide the thin-walled sleeve not only on the inside in the radial direction of the shafts with respect to the fluid containing section, but also on the outside in the radial direction.

In the case in which the thin-walled sleeve is provided on both the inside and the outside in the radial direction of the shaft with respect to the fluid containing section, the action of pressure of the fluid inside the fluid containing section, that is, the action of the pressure acting to deform the thin-walled sleeve, is distributed between the thin-walled sleeve provided on the inside in the radial direction and the thin-walled sleeve provided on the outside in the radial direction. On the other hand, by providing the thin-walled sleeve 54a only on the inner side in the radial direction of the shafts 44 and 244 with respect to the fluid containing section 58, the action of the pressure is concentrated on the thin-walled sleeve 54a, and therefore, it is possible to cause deformation of the thin-walled sleeve 54a more efficiently. Thus, the above-noted embodiment is more preferable.

It is further possible to make the oil intervene in the gap 57 between the thin-walled sleeve 54a and the shafts 44 and 244, and further provide grooves in the surface of the shafts 44 and 244 for letting the oil flow therein when the thin-walled sleeve 54a is caused to deform towards the shafts 44 and 244 to clamp the shafts 44 and 244.

Figure 12:
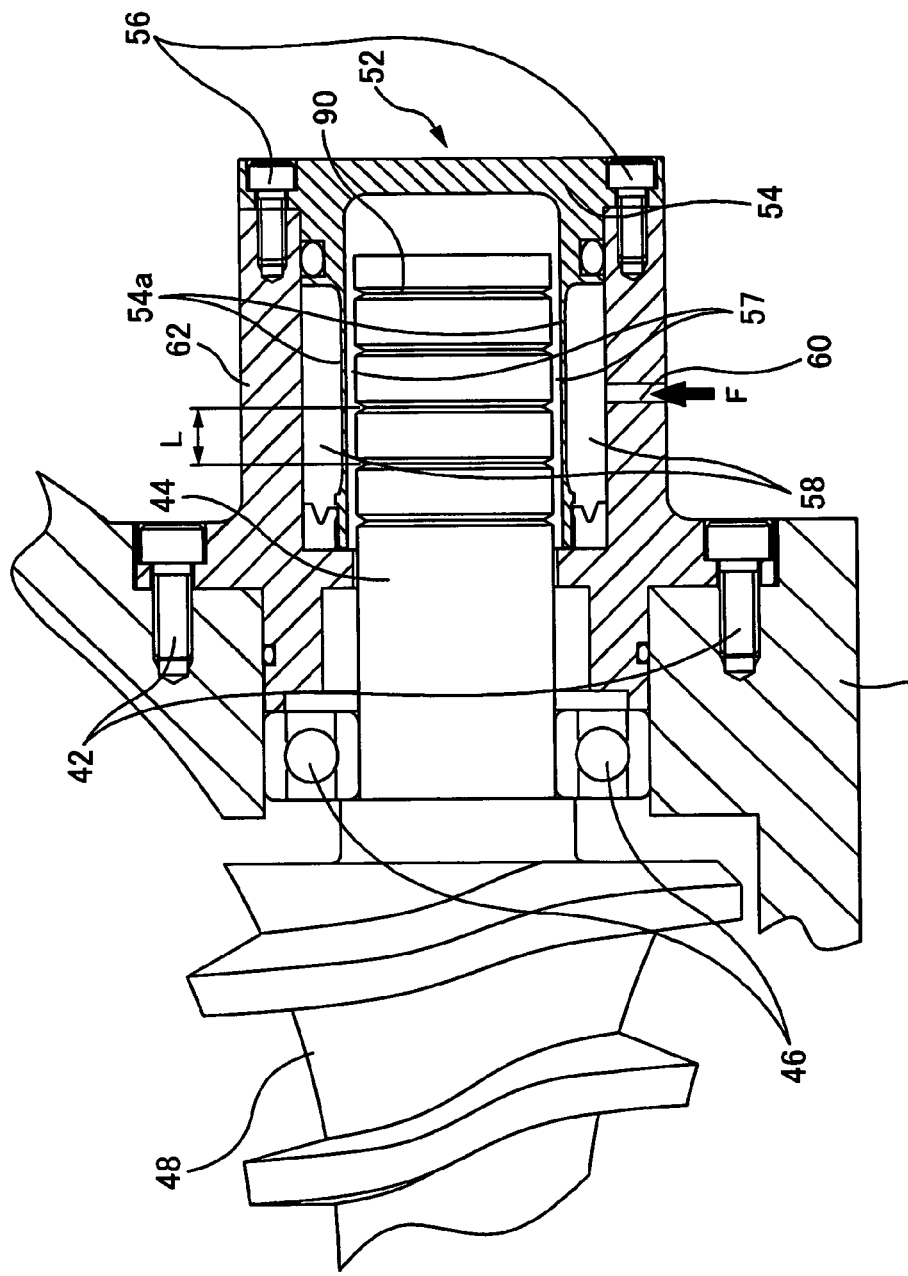
FIG. 12 is a diagram showing part of an inclining and rotating table apparatus having a driven rotating shaft provided with grooves and a clamping device for clamping the driven rotating shaft.
Figure 13:
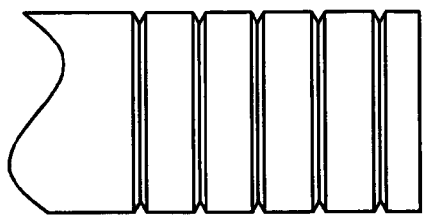
FIG. 13 is a diagram showing variations of the groove shape.
Figure 13:
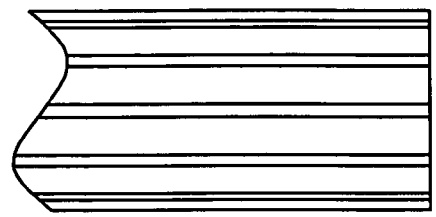
Figure 13:
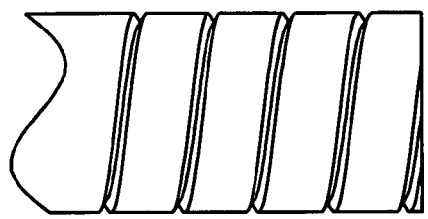
Figure 13:
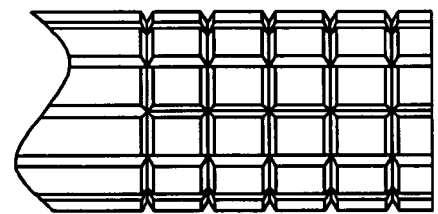
Figure 13:
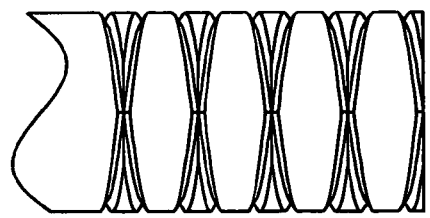
Figure 13:
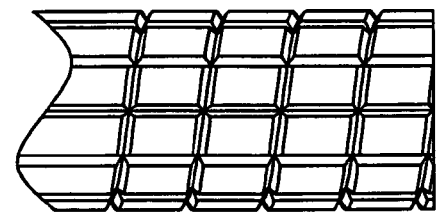
Figure 14:
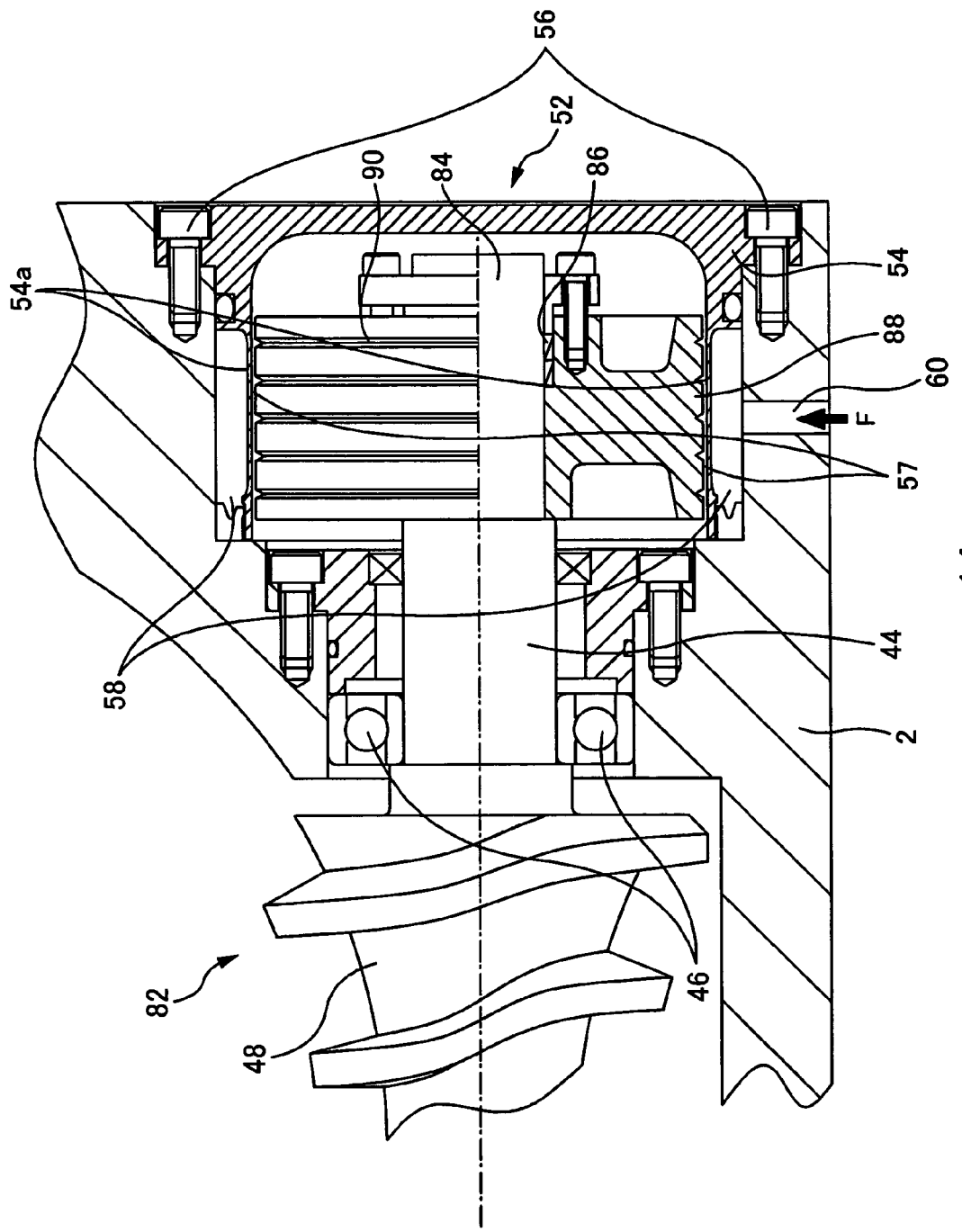
FIG. 14 is a diagram showing part of an inclining and rotating table apparatus having a driven rotating shaft provided with grooves and a clamping device for clamping the driven rotating shaft.

The above aspects are described below in further detail, using FIG. 12 through FIG. 14. FIG. 12 and FIG. 14 are diagrams showing a part of an inclining and rotating table apparatus having a driven rotating shaft provided with grooves and a clamping device for clamping the driven rotating shaft. FIG. 12 corresponds to FIG. 5, and FIG. 14 corresponds to FIG. 11. FIG. 13 is a diagram showing variations of the of the groove shape. In this case as well, only an example in which the clamping device 52 is applied to the driven rotating shaft 44 is described below, but the case in which the clamping device 252 is applied to the driven turning shaft 244 is also possible.

First, attention is paid on FIG. 12. The inclining and rotating table apparatus 1 shown in FIG. 12 is different from the inclining and rotating table apparatus 1 shown in FIG. 5 in terms that the gap 57 between the thin-walled sleeve 54a and the driven rotating shaft 44 is filled with an oil, and that grooves 90 are provided in the surface of the driven rotating shaft 44, but otherwise, it has the same configuration as the inclining and rotating table apparatus 1 shown in FIG. 5. In this embodiment, the driven rotating shaft 44 has a plurality of grooves 90, and each of the grooves 90 runs in the circumferential direction around the driven rotating shaft 44.

With the inclining and rotating table apparatus 1 configured in this way, the driven rotating shaft 44 is clamped by deforming the thin-walled sleeve 54a through the pressure of the fluid F that is filled into the fluid containing section 58, as explained above. When this happens, the gap 57 that was located between the thin-walled sleeve 54a and the driven rotating shaft 44 disappears, and the oil in the gap 57 flows into the grooves 90 that are provided in the surface of the driven rotating shaft 44.

In the following, the effect that is attained by providing oil in the gap 57 and arranging grooves 90 in the surface of the driven rotating shaft 44 is explained. When the driven rotating shaft 44 is clamped and a large rotation load is exerted on the driven rotating shaft 44, there is a possibility that the driven rotating shaft 44 and the thin-walled sleeve 54a may get locked due to the friction heat occurring between the driven rotating shaft 44 and the thin-walled sleeve 54a. The oil fulfills the function of preventing the occurrence of such locking in the event that a large rotation load is exerted on the driven rotating shaft 44. However, in ordinary situations, due to the effect of the oil provided in the gap 57, the driven rotating shaft 44 and the thin-walled sleeve 54a are prone to slide against each other, and thus, there is the problem that a sufficient clamping capability cannot be attained.

In order to address this problem, grooves 90 are provided in the surface of the driven rotating shaft 44. Thus, the oil in the gap 57 flows into the grooves 90 when the thin-walled sleeve 54a clamps the driven rotating shaft 44, and slippage between the driven rotating shaft 44 and the thin-walled sleeve 54a is prevented, thus solving the above-noted problem.

It should be noted that the interval in the axial direction of the driven rotating shaft 44 between neighboring grooves 90, of among the plurality of grooves 90, (in FIG. 12, this interval is marked by the letter L) is most preferably at least 3 mm and at most 10 mm, in terms of ensuring a sufficient groove volume for properly allowing the oil in the gap 57 to flow in, and in terms of ensuring a sufficient area in the surface of the driven rotating shaft 44 where no grooves 90 are provided, such that the clamping capability of the clamping device is not impaired.

Moreover, regarding the shape of the grooves 90, there is no limitation to the shape shown in FIG. 12, and for example, also the shapes shown in FIG. 13 are possible. Also, if the grooves 90 are provided in the driven rotating shaft 44 according to the third modification example, then the grooves 90 are provided in the brake rotor 88, which constitutes the driven rotating shaft 44 together with the shaft section 84 (see FIG. 14). Thus, it is possible to achieve the same effect also with the third modification example.

Although preferred embodiments of the present invention have been described, it should be understood that various changes, substitutions and alterations can be made therein without departing from spirit and scope of the invention as defined by the appended claims.

What is claimed is:

1. An inclining and rotating table apparatus comprising:
    a base;
    a rotary table device supported by said base, the rotary table device having
        a driven rotating shaft driven to rotate by a first drive source,
        a rotary table, and
        a rotating turret that is connected to said rotary table and is rotated by said driven rotating shaft; and
    an oscillating turret;
    a driven turning shaft on said base for causing inclination of a table surface of said rotary table device by causing said oscillating turret to turn, said driven turning shaft being driven to turn by a second drive source; and
    a clamping device for clamping at least one of said driven rotating shaft and said driven turning shaft;
    wherein said clamping device has a thin-walled sleeve arranged such that a gap is provided along a circumferential direction of at least one of said driven rotating shaft and said driven turning shaft;
    said clamping device clamps said at least one of said driven rotating shaft and said driven turning shaft by deforming said thin-walled sleeve towards said at least one of said driven rotating shaft and said driven turning shaft;
    said gap includes an oil; and
    a surface of said at least one of said driven rotating shaft and said driven turning shaft is provided with a groove into which said oil flows when said clamping device clamps said at least one of said driven rotating shaft and said driven turning shaft by deforming said thin-walled sleeve towards said at least one of said driven rotating shaft and said driven turning shaft.

2. An inclining and rotating table apparatus according to claim 1,
    wherein said thin-walled sleeve has a thickness of 5 mm or less.

3. An inclining and rotating table apparatus according to claim 1,
    wherein said clamping device is provided for clamping both said driven rotating shaft and said driven turning shaft.

4. An inclining and rotating table apparatus according to claim 1,
    wherein said driven rotating shaft and said driven turning shaft each has a cam;
    wherein said rotary table and said rotary table device each has a cam follower; and
    wherein, using said cam and said cam follower, said rotary table is driven to rotate by said driven rotating shaft, and said rotary table device is driven to turn by said driven turning shaft.

5. An inclining and rotating table apparatus according to claim 1,
    wherein said inclining and rotating table apparatus has neither
        a dwelling period in which said rotary table does not rotate even though said driven rotating shaft is driven and rotating, nor
        a dwelling period in which said rotary table device does not turn even though said driven turning shaft is driven and turning.

6. An inclining and rotating table apparatus according to claim 1,
    wherein said clamping device clamps said at least one of said driven rotating shaft and said driven turning shaft by deforming said thin-walled sleeve such that said thin-walled sleeve adapts to the shape of a circumferential surface of said at least one of said driven rotating shaft and said driven turning shaft.

7. An inclining and rotating table apparatus according to claim 1,
wherein said thin-walled sleeve is positioned on an outer side in a radial direction of said at least one of said driven rotating shaft and said driven turning shaft; and
wherein said clamping device clamps said at least one of said driven rotating shaft and said driven turning shaft by deforming said thin-walled sleeve from said outer side in the radial direction towards said at least one of said driven rotating shaft and said driven turning shaft.

8. An inclining and rotating table apparatus according to claim 7,
wherein said clamping device further comprises a fluid containing section for containing a fluid, said fluid containing section being arranged on said outer side in the radial direction with respect to said thin-walled sleeve; and
wherein said clamping device deforms said thin-walled sleeve by a pressure of the fluid that is filled into said fluid containing section.

9. An inclining and rotating table apparatus according to claim 8,
wherein said thin-walled sleeve is arranged only on an inner side in the radial direction of said at least one of said driven rotating shaft and said driven turning shaft with respect to said fluid containing section.

10. An inclining and rotating table apparatus according to claim 1,
wherein said driven rotating shaft has a roller gear cam;
wherein said rotary table has a cam follower; and
wherein, using said roller gear cam and said cam follower, said rotary table is driven to rotate by said driven rotating shaft without causing backlash.

11. An inclining and rotating table apparatus according to claim 10,
wherein said clamping device for clamping said shaft is provided on said driven rotating shaft.

12. An inclining and rotating table apparatus according to claim 1,
wherein said driven turning shaft has a roller gear cam;
wherein said rotary table device has a cam follower; and
wherein, using said roller gear cam and said cam follower, said rotary table device is driven to turn by said driven turning shaft without causing backlash.

13. An inclining and rotating table apparatus according to claim 12, wherein said clamping device for clamping said shaft is provided on said driven turning shaft.

* * * * *